United States Patent [19] [11] Patent Number: 5,948,715
Brandt et al. [45] Date of Patent: Sep. 7, 1999

[54] WHISKER-REINFORCED CERAMIC CUTTING TOOL MATERIAL

[75] Inventors: Gunnar Brandt, Solna; Magnus Ekelund, Järna, both of Sweden

[73] Assignee: Sandvik AB, Sandviken, Sweden

[21] Appl. No.: 09/097,666

[22] Filed: Jun. 16, 1998

[30] Foreign Application Priority Data

Jul. 8, 1997 [SE] Sweden ................................. 9702665

[51] Int. Cl.$^6$ .................................................. C04B 35/81
[52] U.S. Cl. ......................... 501/95.3; 501/87; 501/96.1; 501/127; 407/119
[58] Field of Search .......................... 501/87, 95.3, 96.1, 501/127; 407/119

[56] References Cited

U.S. PATENT DOCUMENTS

| 4,867,761 | 9/1989 | Brandt et al. . | |
|---|---|---|---|
| 5,141,901 | 8/1992 | Brandt . | |
| 5,231,060 | 7/1993 | Brandt . | |
| 5,360,772 | 11/1994 | Hayashi et al. | 501/95.3 |
| 5,418,197 | 5/1995 | Brandt | 501/95.3 |
| 5,420,083 | 5/1995 | Brandt | 501/95.3 |
| 5,505,751 | 4/1996 | Mehrotra et al. | 501/87 |
| 5,795,384 | 8/1998 | Coyle et al. | 117/87 |

*Primary Examiner*—Karl Group
*Attorney, Agent, or Firm*—Burns, Doane, Swecker & Mathis, L.L.P.

[57] ABSTRACT

Oxide-based ceramic cutting inserts for chipforming machining of steel, comprising a ceramic oxide-based matrix of alumina and less than 10% by volume zirconia and 5–40% by volume of homogeneously dispersed whiskers based upon $(Ta_xHf_yTi_{1-x-y})C_{1-z}N_z$ where $0<x<0.75$ and $0<y<0.75$, $x+y>0.25$ and $0 \leq z<1$.

9 Claims, No Drawings

WHISKER-REINFORCED CERAMIC CUTTING TOOL MATERIAL

BACKGROUND OF THE INVENTION

The present invention relates to ceramic cutting tool materials and, in particular, to such cutting materials in which monocrystalline whiskers are uniformly distributed in a ceramic matrix containing aluminum oxide which leads to an improved strength and toughness and, in particular, improved thermal shock resistance without negatively influencing the wear resistance.

Ceramic cutting tools have now been available for several decades, but they have not until the last years, had any great commercial importance for use in chipforming machining. The main reason for the limited growth of ceramic cutting tools has been sudden and unexpected tool failures because of their inherent inadequate strength, toughness and thermal shock resistance.

In the last decade, the properties of ceramic cutting tool materials have been improved in many respects and their use in cutting of cast iron and aerospace alloys have increased. In the cutting of steel, which is the completely dominating work piece material, the use of ceramic cutting inserts is still very modest because said workpiece material makes large simultaneous demands upon strength, toughness and wear and thermal shock resistance which have only partially been fulfilled by currently known ceramic cutting tool materials.

Aluminum oxide-based cutting tool materials are very sensitive to thermal crack formation because aluminum oxide in itself, has a relatively low thermal conductivity. This leads to very short tool lives in steel machining, particularly under conditions with short engagement times and varying cutting depths.

To a certain extent, the thermal properties have been improved by additions of titanium carbide and/or titanium nitride which enhance the thermal conductivity of the composite material. The addition of titanium carbide/nitride also increases the hardness of the material. In comparison with pure aluminum oxide materials, an increased tool life is therefore obtained in the cutting of harder work piece materials and in operations demanding resistance to thermal shocks. However, this kind of material has too poor a toughness behavior for general use in the cutting of steel.

Another later step of development relates to uniformly dispersed, fine-grained zirconium oxide particles in a matrix of aluminum oxide. A transition of the tetragonal 'metastable' zirconium oxide particles to a stable monoclinic phase with a concomitant increase in the volume of the $ZrO_2$ particles during use increases both strength and toughness and thus leads to a more predicable tool life.

The thermal properties of said type of materials are however, only slightly better than those of pure aluminum oxide materials. Therefore, initiation and growth of thermally induced cracks is still a great problem in practical cutting operations generating high cutting edge temperature such as the cutting of steel.

It has been shown that reinforcement with SiC whiskers of a matrix of aluminum oxide leads to a greatly improved fracture toughness and strength. Ceramic cutting tool materials based upon said concept have shown very good performance in the cutting of hot strength materials in particular, but in the cutting of steel they have shown surprisingly short tool lives because of preferential chemical attach of the SiC whiskers. This leads to a weakening of the surface zone with accompanying high wear and risks of crack initiation.

In U.S. Pat. No. 4,867,761, oxide-based ceramic cutting tool materials are strengthened by whiskers of carbides, nitrides and borides of Ti or Zr or solid solutions thereof, having a low solubility in steel resulting in a cutting tool material having at the same time an improved, more predictable toughness, as well as improved strength and resistance to thermal shocks without deterioration of the wear resistance to any appreciable degree, particularly when cutting steel. This was not possible with earlier known material compositions.

Further improvements, especially with respect to thermal shock resistance and fracture toughness were made in U.S. Pat. Nos. 5,141,901 and 5,231,060, disclosing oxide-based ceramic cutting tool materials strengthened by whiskers having a linear thermal expansion coefficient being lower than that of $Al_2O_3$, preferably at the most 85% of that for $Al_2O_3$ measured at 300–1300K. The preferred whiskers being carbides, nitrides and borides of Ta, carbides of Nb, Hf and V and nitrides of Hf.

Swedish Patent Application 9601335-4, which corresponds to U.S. Pat. No. 5,851,285, herein incorporated by reference, discloses a method of producing whiskers in large volumes and at low cost to be used as reinforcing material. The whiskers consist of solid solutions between two or more transition metal carbides, nitrides and carbonitrides having preferably submicron diameters.

The properties of a whisker reinforced cutting tool material based on alumina, depend to a large extent on the properties of the whiskers themselves and also on the difference in thermoelastic properties between the whisker and the matrix material. It is known that wear resistance when machining steel depends on the solubility of the whisker material in steel since alumina is practically insoluble. Experimentally, it has been found that the crater wear rates of different carbide coatings when machining steel can be reasonably predicted from solubility data. Experimentally, the following relative crater wear rates have been found.

TABLE 1

Relative Crater Wear Rates When Machining Steel

| Carbide | Wear Rate |
|---------|-----------|
| HfC | 1 |
| TiC | 2.6 |
| ZrC | 5.7 |
| TaC | 10.4 |
| NbC | 16.7 |

The thermal shock and fracture toughness properties of the composite depend on the thermal expansion coefficient for the whisker material. The corresponding thermal expansion coefficients are given in Table 2.

TABLE 2

Thermal Expansion Coefficient (300–1300° C.)

| Carbide | Thermal Expansion Coefficient $10^{-6} \cdot K^{-1}$ |
|---------|-----------|
| HfC | 6.5 |
| TiC | 7.5 |
| ZrC | 7.0 |
| TaC | 4–6.5 |
| NbC | 5–7 |

When comparing Tables 1 and 2, it is obvious that whiskers with the highest potential for a thermal shock resistant composite, e.g., TaC, have a considerably lower wear resistance than TiC, which might give a composite prone to thermal cracking under heavy thermal loads.

Alumina based composites made from carbide, nitride and boride whiskers of transition metals such as Ti, Ta, Nb, Zr and Hf, according to the prior art, consequently have a rather narrow application range since the composite properties depend mainly on the properties of the whisker itself, which are given by the transition metal in question. This means that for many applications, the optimum properties cannot be arrived at using any of the aforementioned whiskers.

OBJECTS AND SUMMARY OF THE INVENTION

It is an object of this invention to avoid or alleviate the problems of the prior art.

It is further an object of this invention to provide an improved whisker reinforced ceramic cutting tool material for machining steel and aerospace alloys, especially during thermal shock demanding conditions, i.e., short machining times and machining with cutting fluid.

It is an aspect of the invention to provide an oxide-based ceramic cutting insert for chipforming machining of steel, comprising a ceramic oxide-based matrix of alumina, less than 10% by volume zirconia and 5–40% by volume of homogeneously dispersed whiskers of $(Ta_xHf_yTi_{1-x-y})C_{1-z}N_z$ where $0<x<0.75$, $0 \leq y<0.75$, $x+y>0.25$ and $0 \leq z<1$.

DETAILED DESCRIPTION OF THE PREFERRED EMBODIMENTS OF THE INVENTION

The ceramic cutting tool material of the presently claimed invention comprises an oxide-based, preferably an aluminum oxide-based, matrix with 5–50% by volume, preferably 10–40% by volume, most preferably 20–35% by volume, of homogeneously dispersed whiskers based upon a solid solution having an overall composition of $(Ta_xHf_yTi_{1-x-y})C_{1-z}N_z$ where $0<x<0.75$, $0 \leq y<0.75$, $x+y>0.25$ and $0 \leq z<1$. In one preferred embodiment, $y=0$ and $x$ is preferably $>0.4$. In another preferred embodiment, $y>0.05$, preferably $y>0.1$, most preferably $y>0.25$, and $x$ is preferably $>0.15$. Besides carbon and nitrogen, the whiskers will contain some residual oxygen from the synthesis. The amount of residual oxygen increases with increasing amounts of Ti and can be up to some weight percent. It is possible for the skilled artisan to design the properties so that a desired thermal expansion coefficient or a desired chemical property of the whisker can be obtained and consequently, the composite properties can be designed accordingly to meet specific demands on machining properties.

The whisker material consists of monocrystals with a diameter of 0.2–5 μm, preferably 0.2–1.0 μm, and a length of 2.5–100 μm, preferably 2.5–40 μm, and a length/diameter ratio that is preferably 5–10. The grain size of the oxide matrix shall be <10 μm, preferably <4 μm. The oxide matrix is essentially ceramic oxide or ceramic oxide mixed with hard carbides and/or nitrides and/or borides of micron or submicron (nano) size and/or binder metal and suitable sintering additives. Preferably, the ceramic matrix shall contain <10% by volume of $ZrO_2$.

The cutting tool material is made by wet milling and mixing of the oxide based powder, possibly also including sintering additives and whisker crystals. After drying, the mixture is pressed to the desired geometrical form and sintered with or without pressure to almost theoretical density. Pressureless sintering or GPS (Gas Pressure Sintering) are the preferred consolidation methods, but high whisker loadings may necessitate hot pressing in a graphite tool or hot isostatic pressing after canning. The sintering method is dependent upon the amount of whiskers, the whisker composition and also the amount of sintering additives and is chosen so that the cutting tool material reaches a density exceeding 99% of the theoretical density.

The use of whisker reinforcement in aluminum oxide-based matrix leads to a significant increase of the fracture toughness. The mechanism causing said increase can be load transfer between the whisker and matrix, crack deflection and whisker pull-out. Said mechanisms exploit and depend upon crack propagation occurring along a sufficiently weak interface between the whisker and matrix. The bonding force between the whisker and matrix is therefore an important parameter which can be influenced by coating the whisker material with thin layers of, for example, BN or graphite in order to further improve the fracture strength. In the actual case, a contribution from the internal strain being formed by use of whiskers with lower thermal expansion coefficient than that of the matrix is also obtained.

The invention is additionally illustrated in connection with the following Example which is to be considered as illustrative of the present invention. It should be understood, however, that the invention is not limited to the specific details of the Example.

EXAMPLE

30% by volume of the whisker materials, according to Table 3, were wet mixed with 70% by volume of high purity $Al_2O_3$ (grade APA-0.5 from Ceralox) with 0.2% by weight of MgO (grade Marinco OLMN 3221 from Merck & Co.). After drying, the mixtures were hot pressed to bodies at 1650° C., 30 MPa to 99% of the theoretical density.

The (Ta,Ti)C whisker material, made according to Swedish Patent Application No. 9601335-4, which corresponds to U.S. patent application Ser. No. 08/770,849, had a composition of $(Ta_{0.58}Ti_{0.42})C$, according to EDS-analysis.

The (Ta,Hf,Ti)C whisker material, made according to Swedish Patent Application No. 9601335-4, which corresponds to U.S. patent application Ser. No. 08/770,849, had a composition of $(Ta_{0.21}Hf_{0.39}Ti_{0.40})C$, according to EDS-analysis.

$K_{IC}$ was measured by means of the Indentation Fracture Toughness method. In said method, an indentation is made by means of a pyramid diamond tip and $K_{IC}$ is calculated from the size of the cracks produced from the corners of the indentation.

For the measurement, a reference of pure $Al_2O_3$ was also used.

$K_{IC}$-values for the various materials are given in Table 3.

TABLE 3

$K_{IC}$-values for the Various Materials

| # | Material | $K_{IC}$ |
|---|---|---|
| 1. Prior Art | $Al_2O_3$-TiC whiskers | 4.5 |
| 2. Prior Art | $Al_2O_3$-TaC whiskers | 5.0 |
| 3. Invention | $Al_2O_3$-(Ta, Ti)C whiskers | 4.9 |

TABLE 3-continued

K$_{IC}$-values for the Various Materials

| # | Material | K$_{IC}$ |
|---|----------|----------|
| 4. Invention | Al$_2$O$_3$-(Ta, Hf, Ti)C whiskers | 4.7 |
| 5. Prior Art | Al$_2$O$_3$-SiC whiskers | 5.0 |
| 6. Prior Art | Al$_2$O$_3$ | 3.6 |

An indentation quench method was used to determine the resistance to thermal shock. The inserts to be tested were precracked with Vickers indents to get cracks of well-defined size and location. The indented inserts were then heated to different temperatures ranging from 300°–900° C. (at 25° C. intervals) in a furnace and subsequently quenched into boiling water. The critical temperature difference $\Delta T_c$ was defined as the lowest temperature difference (T$_{furnace}$–100° C.) where the following two conditions were simultaneously fulfilled:

a) the average elongation of the cracks was more than 10% of the original length; and b) more than 25% of the cracks had propagated.

$\Delta T_c$-values for the materials are given in Table 4

TABLE 4

$\Delta T_c$-values for the Various Materials

| # | Material | $\Delta T_C$ |
|---|----------|--------------|
| 1. Prior Art | Al$_2$O$_3$-TiC whiskers | 175 |
| 2. Prior Art | Al$_2$O$_3$-TaC whiskers | 600 |
| 3. Invention | Al$_2$O$_3$-(Ta, Ti)C whiskers | 450 |
| 4. Invention | Al$_2$O$_3$-(Ta, Hf, Ti)C whiskers | 500 |
| 5. Prior Art | Al$_2$O$_3$-SiC whiskers | 625 |
| 6. Prior Art | Al$_2$O$_3$ | 150 |

From Table 4, it is evident that by reinforcement of the matrix with whiskers with a low thermal expansion coefficient, it is possible to obtain a large increase in the resistance to thermal shock.

In Table 5, the tool wear after 10 minutes is listed after a continuous turning operation in Steel SS 2511 (similar to AISI 5115). The cutting data were v$_c$=550 m/min, f=0.36 mm/rev and a$_p$=2.0 mm.

TABLE 5

Tool Wear After 10 Minutes

| # | Material | V$_B$, mm |
|---|----------|-----------|
| 1. Prior Art | Al$_2$O$_3$-TiC whiskers | 0.15 |
| 2. Prior Art | Al$_2$O$_3$-TaC whiskers | 0.25 |
| 3. Invention | Al$_2$O$_3$-(Ta, Ti)C whiskers | 0.18 |
| 4. Invention | Al$_2$O$_3$-(Ta, Hf, Ti)C whiskers | 0.16 |
| 5. Prior Art | Al$_2$O$_3$-SiC whiskers | ** |
| 6. Prior Art | Al$_2$O$_3$ | 0.14 |

The resistance to thermal shock was further tested in an interrupted facing operation of Steel SS 2511 with cutting fluid. The facing was discontinuous so that 9 entrances and exits were obtained during one facing in order to vary the cutting edge temperature. The cutting data were v$_c$=550 m/min, f=0.36 mm/rev and a$_p$=2.0 mm.

In Table 6, the tool lives are listed after machining.

TABLE 6

Tool Life After a Facing Operation with Cutting Fluid (Average After Three Facings)

| # | Material | Tool Life (Number of Facings) |
|---|----------|-------------------------------|
| 1. Prior Art | Al$_2$O$_3$-TiC whiskers | 2 |
| 2. Prior Art | Al$_2$O$_3$-TaC whiskers | >10 |
| 3. Invention | Al$_2$O$_3$-(Ta, Ti)C whiskers | >10 |
| 4. Invention | Al$_2$O$_3$-(Ta, Hf, Ti)C whiskers | >10 |
| 5. Prior Art | Al$_2$O$_3$-SiC whiskers | >10 (crater wear) |
| 6. Prior Art | Al$_2$O$_3$ | <1 |

The results show that a superior combination of fracture toughness, thermoshock resistance and wear resistance can be obtained with the special type of whisker material according to the presently claimed invention.

The use of solid solution whiskers permits design of the cutting tool composite for optimum performance for specific applications. When machining steel with cutting fluid, which is the dominating application, the best wear resistance is obtained with pure alumina or alumina TiC whisker reinforced cutting tools. Tool life, however, is determined by thermal cracking for these materials, which makes commercial application impossible.

Alumina-tantalum carbide whiskers on the other hand, have a sufficient thermal shock resistance, but wear rates are fairly high, leading to unnecessarily short tool lives.

(Ta,Hf,Ti)C whisker reinforced alumina can be designed to obtain sufficient thermal shock resistance without sacrificing wear resistance to any large extent by adjusting the relative amounts of Ta, Hf, and Ti to the required $\Delta T_C$.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oxide-based ceramic cutting insert for chipforming machining of steel, comprising a ceramic oxide-based matrix of alumina, less than 10% by volume zirconia and 5–40% by volume of homogeneously dispersed whiskers of (Ta$_x$Hf$_y$Ti$_{1-x-y}$)C$_{1-z}$N$_z$ where 0<x<0.75, 0≦y<0.75, x+y>0.25 and 0≦z<1.

2. The cutting tool insert of claim 1 wherein y=0.

3. The cutting tool insert of claim 2, wherein x>0.4.

4. The cutting tool insert of claim 1 wherein y>0.05.

5. The cutting tool insert of claim 1 wherein y>0.1.

6. The cutting tool insert of claim 1 wherein y>0.25.

7. The cutting tool insert of claim 4, wherein x>0.15.

8. The cutting tool insert of claim 1 wherein the oxide-based matrix contains 10–40% by volume of said whiskers.

9. The cutting tool insert of claim 1 wherein the oxide-based matrix contains 20–35% by volume of said whiskers.

\* \* \* \* \*